(12) United States Patent
Sakurai et al.

(10) Patent No.: US 8,107,818 B2
(45) Date of Patent: Jan. 31, 2012

(54) TUNABLE FILTER

(75) Inventors: Yasuki Sakurai, Aichi (JP); Changho Chong, Aichi (JP)

(73) Assignee: Santec Corporation, Komaki (JP)

( * ) Notice: Subject to any disclaimer, the term of this patent is extended or adjusted under 35 U.S.C. 154(b) by 589 days.

(21) Appl. No.: 12/271,955

(22) Filed: Nov. 17, 2008

(65) Prior Publication Data
US 2009/0097120 A1    Apr. 16, 2009

(30) Foreign Application Priority Data
Jan. 16, 2007 (JP) ................... 2007-006868

(51) Int. Cl.
*H04J 14/02* (2006.01)
(52) U.S. Cl. ............... 398/85; 398/84; 398/87; 398/79; 398/212
(58) Field of Classification Search ............ 398/85, 398/84, 87, 82, 79, 212
See application file for complete search history.

(56) References Cited

U.S. PATENT DOCUMENTS
6,356,674 B1 *   3/2002   Davis et al. ............ 385/10

FOREIGN PATENT DOCUMENTS
JP   5-281486 A   10/1993
JP   2004-177605 A   6/2004
* cited by examiner

*Primary Examiner* — Kinam Park
(74) *Attorney, Agent, or Firm* — Smith Patent Office

(57) ABSTRACT

A light is incident on a refractive diffraction grating 13, and is distributed for each of wavelengths at different angles to be outputted. A lens 14 converts the distributed lights into belt-shaped lights, and the belt-shaped lights are incident on a mirror substrate 15 having selective reflection regions 17-1 to 17-x. By moving the mirror substrate 15 toward a direction different from a distribution direction of the belt-shaped lights, only the light of any one of wavelengths is reflected. Then, the light returning to the refractive diffraction grating 13 is reflected to an incident direction of the original light. Accordingly, a tunable filter which is able to select a light of an arbitrary wavelength by moving the mirror substrate 15 can be realized.

4 Claims, 15 Drawing Sheets

F I G. 17A
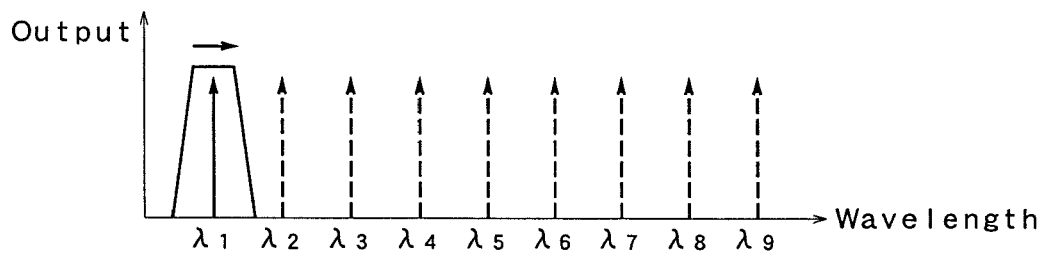
F I G. 17B
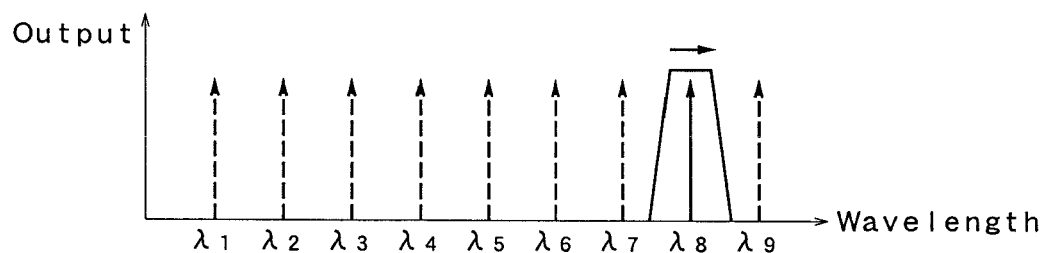
F I G. 17C
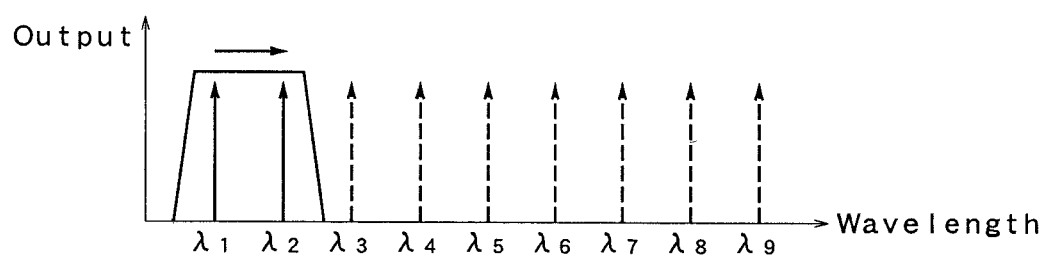
F I G. 17D
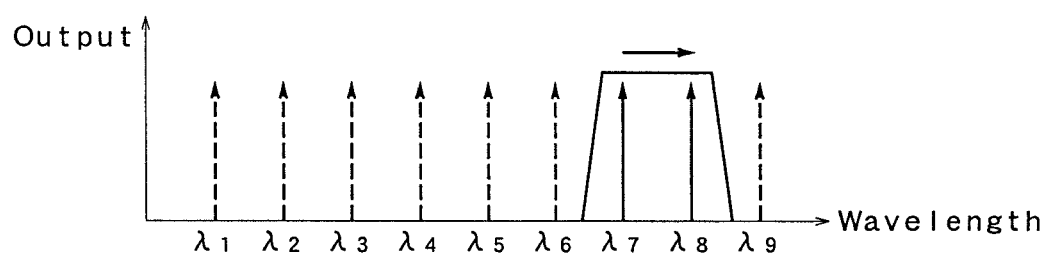

TUNABLE FILTER

BACKGROUND OF THE INVENTION

1. Field of the Invention

The present invention relates to a tunable filter which is able to select a desired wavelength in a light signal including a plurality of wavelengths and which is able to change a wavelength to be selected.

2. Discussion of the Related Art

In an optical communication network using a wavelength division multiplex communication technology (WDM), expansion of a transmission capacity is realized by multiplexing a plurality of wavelengths of lights at wavelength intervals determined by the International Telecommunication Union (ITU). A conventional WDM communication realizes a wavelength multiplexing at an interval of 0.8 nm, for example, in a wavelength band of 1550 nm, and now introduction of a system having a narrow wavelength interval, for example, 0.4 nm or 0.2 nm in further narrow wavelength band is considered. A wavelength-tunable filter is used for selecting a signal of arbitrary wavelength from a multiplexed WDM signal. In addition, the tunable filter is also used in an optical measurement apparatus and a wavelength-tunable laser.

As the tunable filter, a dielectric multilayer filter made by in turn stacking a plurality of materials with different refractive indexes, an optical fiber grating that is a diffraction grating made by in turn arranging cores with low refractive index and with high refractive index in a core of an optical fiber, and a Fabry-Perot etalon using a multiple interference between two reflectors are used.

Widely used in a WDM transmission system is the dielectric multilayer filter where a shape of the filter can be easily controlled. In a case of changing a selected wavelength by using the dielectric multilayer filter, Japanese Unexamined Patent Publication No. 05-281480 shows a method for tuning a wavelength by changing an incidence angle to the dielectric multilayer filter based on changing an incidence angle to a multilayer membrane filter or on changing a thickness of the dielectric multilayer filter to a predetermined axis direction. In addition, Japanese Unexamined Patent Publication No. 2004-177605 shows a configuration of the tunable filter which uses the incidence light as emitted lights arranged in a belt-shaped form for every wavelength and which selects and reflects the light of one wavelength among this emitted lights by using a mirror.

However, in Japanese Unexamined Patent Publication No. 05-281480, the narrower the wavelength is, the larger the total number of membranes in the multilayer membrane is required to be, and thus it is difficult to manufacture a filter with a desired wavelength distribution by accurately producing membrane thicknesses and refractive indexes based on design values.

In Japanese Unexamined Patent Publication No. 2004-177605, a wavelength is selected by moving a mirror and a shielding body to a distribution direction of light, however, it is difficult to move the mirror and the shielding body to a predetermined position accurately.

SUMMARY OF THE INVENTION

The present invention was realized in consideration of the above mentioned conventional faults, and intends to provide a tunable filter by which desired selection characteristics can be accurately obtained without improving a movement precision of a moving element.

To solve the problems, a tunable filter of the present invention comprises: an optical branching element for spatially dispersing an incident light for each of wavelengths in the incident light to output the dispersed lights and for making a selected reflected light be incident toward an incident direction of said incident light; a light focusing element for focusing the lights of respective wavelengths dispersed for each of wavelengths in said optical branching element on an identical plane with keeping a relative relationship of incident position; a mirror substrate which is provided in a movable state at a position on which belt-shaped lights from said light focusing element are focused, and includes a plurality of reflection regions different for each of the lights of wavelengths to be selected, wherein said reflection regions are arranged at an arbitrary position toward a direction different from a distribution direction of said belt-shaped lights; and a driver for moving said mirror substrate toward a direction different from the distribution direction of said belt-shaped lights.

A plurality of said reflection regions of said mirror substrate may be in a rectangular shape whose short side is a constant width in the distribution direction of the belt-shaped light emitted from said light condenser and whose long side is perpendicular to the short side.

Each of said reflection regions of the mirror substrate may comprise a plurality of reflection sub-regions where widths in the distribution direction of the belt-shaped lights emitted from said light focusing element are different from each other.

A width of each said reflection region of the mirror substrate in the distribution direction of the belt-shaped lights emitted from said light focusing element may continuously vary.

To solve the problems, a tunable filter of the present invention comprises: an optical branching element for distributing an incident light for each of wavelengths in the incident light at different angles to output the dispersed lights and for making a selected reflected light be incident toward an incident direction of said incident light; a light condenser for focusing the lights of respective wavelengths dispersed for each of wavelengths in said optical branching element on an identical plane with keeping a relative relationship of incident position; a mirror substrate which is provided in a movable state at a position on which belt-shaped lights from said light condenser are incident, and includes at least one reflection region in a parallelogram shape where a width in a direction perpendicular to the distribution direction of the belt-shaped light emitted from said light condenser is constant, wherein said reflection region is arranged at an arbitrary position toward a direction different from a distribution direction of said belt-shaped lights; and a driver for moving said mirror substrate toward a direction different from the distribution direction of said belt-shaped lights.

Said reflection region of the mirror substrate may include a plurality of reflection regions where widths in the distribution direction of the belt-shaped lights emitted from said light condenser are different from each other.

To solve the problems, a tunable filter of the present invention comprises: an optical branching element for spatially dispersing an incident light for each of wavelengths in the incident light to output the dispersed lights and for making a selected reflected light be incident toward an incident direction of said incident light; a light focusing element for focusing the lights of respective wavelengths dispersed for each of wavelengths in said optical branching element on an identical plane with keeping a relative relationship of incident position; a slit substrate which is provided in a movable state at a position on which belt-shaped lights from said light focusing element are focused, and includes a plurality of slit regions different for each of the lights of wavelengths to be selected, wherein said slit regions are arranged at an arbitrary position toward a direction different from a distribution direction of said belt-shaped lights; a mirror which is provided behind said slit substrate; and a driver for moving said slit substrate toward a direction different from the distribution direction of said belt-shaped lights.

A plurality of said slit regions of said slit substrate may be in a rectangular shape whose short side is a constant width in the distribution direction of the belt-shaped light emitted from said light condenser and whose long side is perpendicular to the short side.

Each of said slit regions of the slit substrate may comprise a plurality of sub-slits where widths in the distribution direction of the belt-shaped lights emitted from said light focusing element are different from each other.

A width of each said slit region of the slit substrate in the distribution direction of the belt-shaped lights emitted from said light focusing element may continuously vary.

To solve the problems, a tunable filter of the present invention comprises: an optical branching element for distributing an incident light for each of wavelengths in the incident light at different angles to output the dispersed lights and for making a selected reflected light be incident toward an incident direction of said incident light; a light condenser for focusing the lights of respective wavelengths dispersed for each of wavelengths in said optical branching element on an identical plane with keeping a relative relationship of incident position; a slit substrate which is provided in a movable state at a position on which belt-shaped lights from said light condenser are incident, and includes at least one slit region in a parallelogram shape where a width in a direction perpendicular to the distribution direction of the belt-shaped light emitted from said light condenser is constant, wherein said slit region is arranged at an arbitrary position toward a direction different from a distribution direction of said belt-shaped lights; a mirror which is provided behind said slit substrate; and a driver for moving said slit substrate toward a direction different from the distribution direction of said belt-shaped lights.

Said slit region of the slit substrate may include a plurality of slit regions where widths in the distribution direction of the belt-shaped lights emitted from said light condenser are different from each other.

According to the present invention, the tunable filter which obtains arbitrary characteristics by moving the mirror substrate and/or the slit substrate can be realized. The digital wavelength selection characteristics and the characteristics which continuously shift a wavelength can be easily obtained by arbitrarily moving the reflection region of the mirror substrate or the slit region of the slit substrate.

BRIEF DESCRIPTION OF THE DRAWINGS

FIG. 17A is a graph showing wavelength-tunable characteristics of a tunable filter according to the embodiment;

FIG. 17B is a graph showing the wavelength-tunable characteristics of the tunable filter according to the embodiment;

FIG. 17C is a graph showing the wavelength-tunable characteristics of the tunable filter according to the embodiment; and FIG. 17D is a graph showing the wavelength-tunable characteristics of the tunable filter according to the embodiment.

DESCRIPTION OF THE PREFERRED EMBODIMENTS

First Embodiment

Figure 1A:
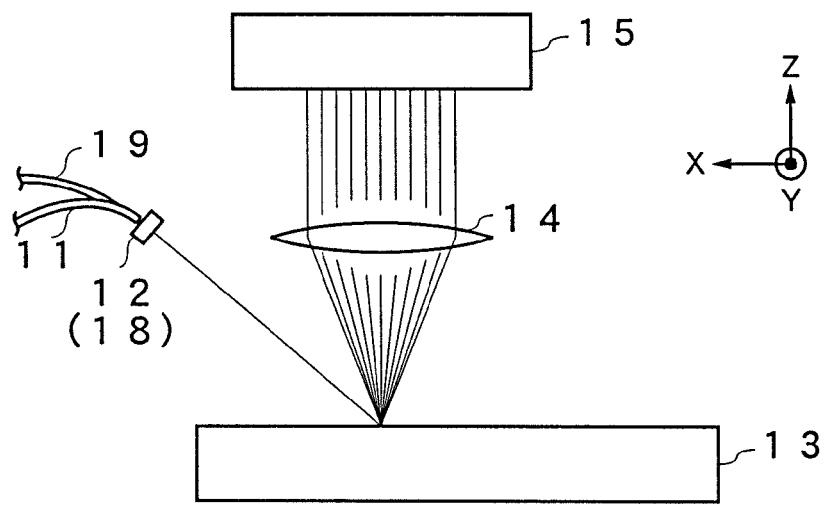
FIG. 1A is a side view seen from a Y axis direction showing a tunable filter according to a first embodiment of the present invention.
Figure 1B:
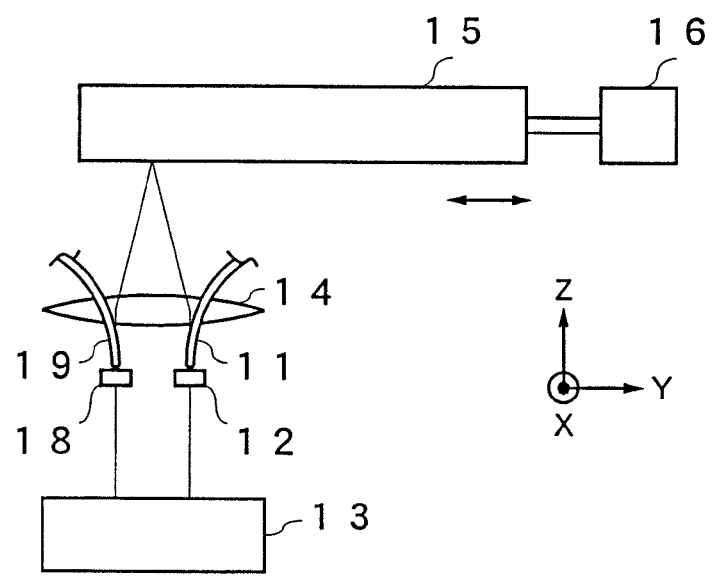
FIG. 1B is a side view seen from a X axis direction showing the tunable filter according to the embodiment.
Figure 2:
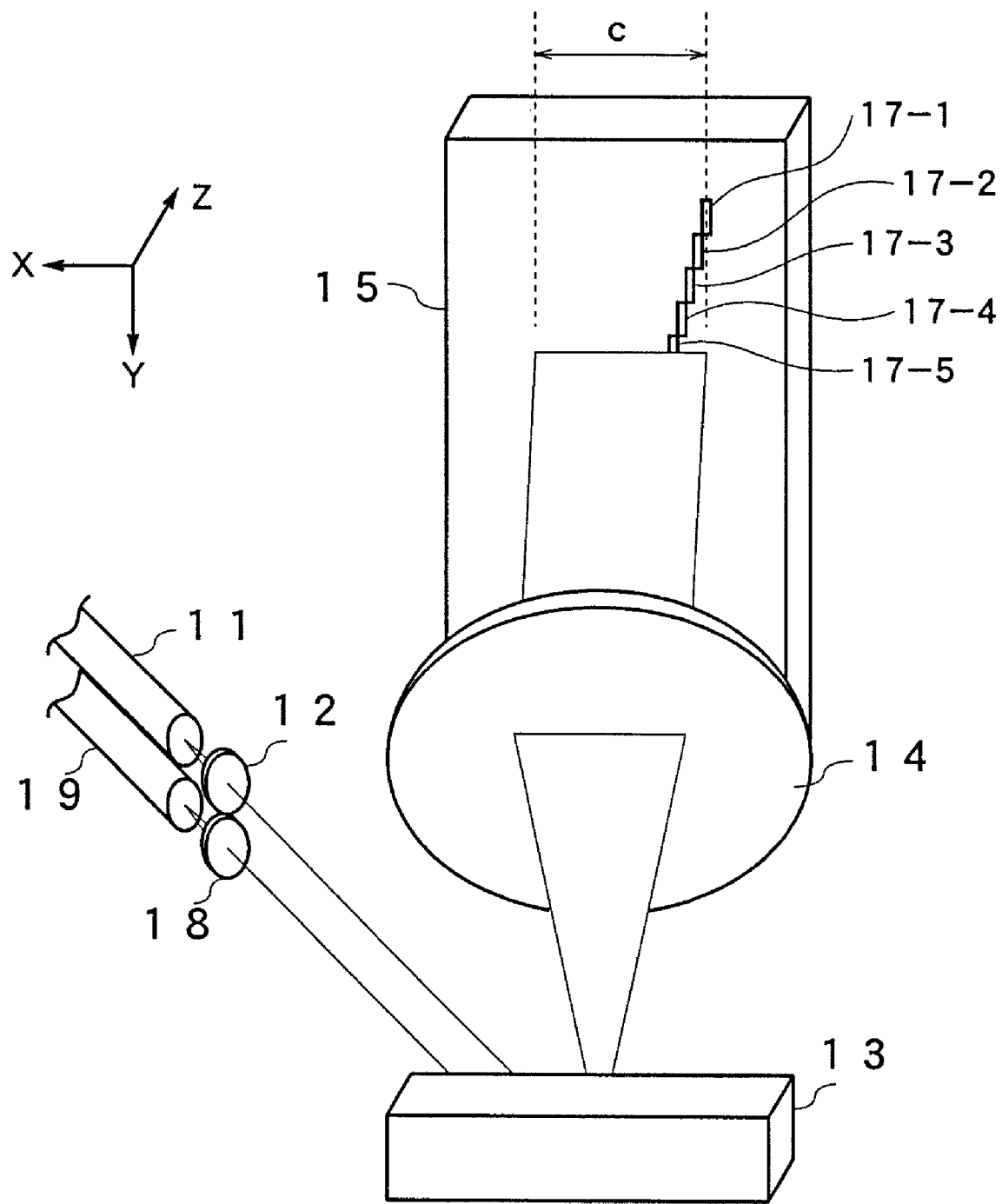
FIG. 2 is a perspective view showing the tunable filter according to the embodiment.

FIG. 1A is a side view seen from a Y axis direction showing a configuration of a wavelength-tunable filter according to a first embodiment of the present invention, FIG. 1B is a side view seen from a X axis direction showing the configuration according to the first embodiment, and FIG. 2 is a perspective view thereof. In these figures, an optical fiber 11 is for the incidence in the WDM communication method. Here, a wavelength multiplexing optical signal is a signal in which wavelengths of many channels is multiplexed at intervals of 0.4 nm from a wavelength $\lambda 1$ to $\lambda x$. An output from the optical fiber 11 is incident on a refractive diffraction grating 13 via a collimate lens 12. The collimate lens 12 collimates an incident light into a parallel light with a certain diameter. The refractive diffraction grating 13 forms gratings equally-spaced at a predetermined pitch on a surface, spatially disperses an incident light depending on its wavelength and reflects the dispersed lights at different angles, and constitutes an optical branching element. When being incident on the lens 14 at a position shifted toward the Y axis direction from a central axis, the belt-shaped lights from the refractive diffraction grating 13 dispersed in each wavelength are focused on an identical plane with keeping a relative positional relationship of the lights of respective wavelengths. The lens 14 is a light focusing element for converting the lights incident from different directions depending on the wavelengths into the belt-shaped lights. This parallel light is incident on the mirror substrate 15. Here, a length from the lens 14 to the mirror substrate 15 is equal to a focal length of the lens 14. The refractive diffraction grating 13, the lens 14, and the mirror substrate 15 are arranged parallel to the XY plane as shown in FIG. 1A. A driver 16 drives the mirror substrate 15 toward the Y axis direction as shown in FIG. 1B. In addition, a collimate lens 18 and an optical fiber 19 are arranged on positions symmetrical about the optical fiber 11 and the collimate lens 12 as shown in FIG. 1B. Here, the optical fiber 11 and the collimate lens 12 constitute an incident part for making lights incident on the optical branching element. The collimate lens 18 and the optical fiber 19 constitute an emission part for outputting the selected light incident from the optical branching element.

Figure 3A:
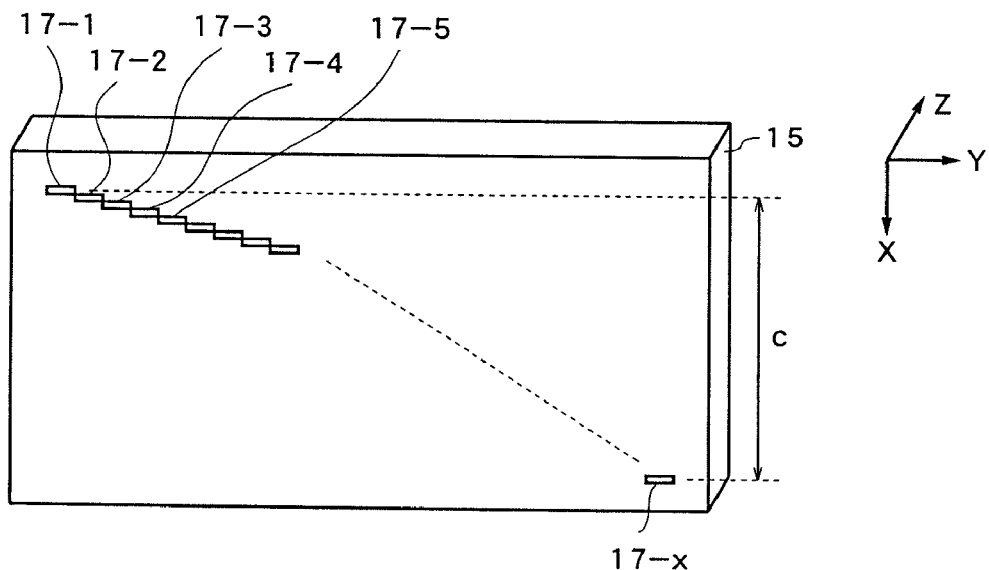
FIG. 3A is a perspective view showing a mirror substrate according to the embodiment.
Figure 3B:
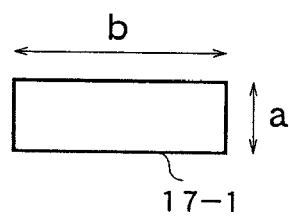
FIG. 3B is a view showing one reflection region in the mirror substrate according to the embodiment.

Many rectangular reflection regions 17-1 to 17-$x$ are formed on a surface of the mirror substrate 15 as shown in FIG. 3A. The X axis direction is a direction of distributing the belt-shaped light emitted from the lens 14. The respective reflection regions 17-1 to 17-$x$ have a rectangular shape with a short side along the X axis direction, and are formed as shown in the figure to be arranged along the Y axis direction in series and along a diagonal line of the mirror substrate 15 with shifting toward the X axis direction. As shown by the reflection region 17-1 in FIG. 3B, a width "a" in the X axis direction is, for example, 10 μm and a width "b" in the Y axis direction is, for example, 30 μm. Other reflection regions 17-2 to 17-$x$ are the same as the reflection region 17-1. In addition, a region other than the reflection region of the mirror substrate 15 directly transmits a light. The mirror substrate 15 is driven in the pitch of width "b" toward the Y axis direction by the aforementioned driver 16. The driver 16 uses, for example, a stepping motor, and moves the mirror substrate 15 accurately to the Y axis direction in a pitch obtained by multiplying the width "b" by an integer number in accordance with a signal from the outside.

When, for example, a diameter of collimate lens light applied from the collimate lens 11 to the refractive diffraction grating 13 is 1 mm, the focal length of the lens 14 is 30 mm, and the number of channels of the WDM light is 100, belt-shaped lights made by branching the WDM light, for example, at intervals of several dozen μm are incident on the mirror substrate 15 shown in FIG. 3A and the width "a" in the X axis direction is 10 μm according to this. An interval "c" along the X direction between both ends of the reflection regions is 1 mm. On the other hand, assuming the width "b" along the Y axis direction is, for example, 30 μm, the widths will be only 3 mm in total even when the widths "b" of 100 channels are arranged so as not to overlap in the Y axis direction.

Figure 4:
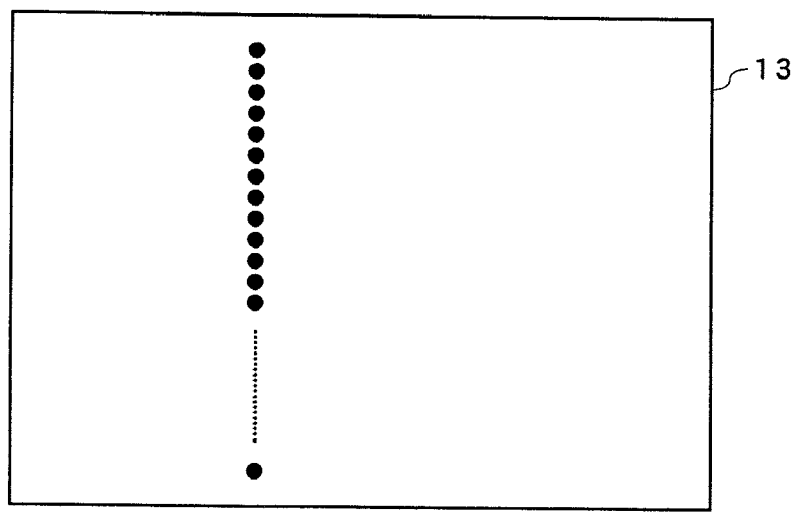
FIG. 4 is a view seen from a Z axis direction showing distributed light in the tunable filter according to the embodiment.

Next, an operation of the tunable filter according to the first embodiment will be explained. A wavelength multiplexing light is incident on the optical fiber 11. The wavelength multiplexing light is composed of wavelength multiplexing lights of wavelengths from $\lambda 1$ to $\lambda x$, that is, when the x is 100 for example, lights where multiplexing lights of 100 channels are multiplexed at even intervals of 0.4 nm. This wavelength multiplexing light is converted into a light with an enlarged diameter by the collimate lens 12, and is applied to the refractive diffraction grating 13. Since reflection directions are different for each wavelength in the diffraction grating 13, the lights of wavelengths from $\lambda 1$ to $\lambda x$ are reflected by the diffraction grating 13 at angles which differ from each other. These lights are converted into belt-shaped lights by the lens 14 as shown in the figure, and are applied to the mirror substrate 15. Here, as shown in FIG. 3A, the above mentioned interval "c" between both ends of the reflection regions of the mirror substrate 15 is conformed to the width of the belt-shaped lights. FIG. 4 is a view, seen from the Z axis direction, showing the belt-shaped lights incident on the mirror substrate 15 from the refractive diffraction grating 13, and respective black spots correspond to the lights of respective wavelengths. As shown in FIG. 2, when the mirror substrate 15 is positioned at a place where the light of wavelength $\lambda 5$, for example, among the belt-shaped lights is incident on a reflection region 17-5, only the light of wavelength $\lambda 5$ is selectively reflected by the reflection region 17-5 and is applied to the refractive diffraction grating 13 via the lens 14 again. And, the light is reflected by the diffraction grating 13 again to be emitted from the optical fiber 11 via the collimate lens 18. The lights of other wavelengths pass through the mirror substrate 15. Accordingly, only the light of wavelength $\lambda 5$ in the wavelength multiplexing light is selected.

In a case of changing a wavelength to be selected, the driver 16 moves the mirror substrate 15 in the Y axis direction. Then, the driver 16 moves the mirror substrate 15 to a position where only the light of wavelength $\lambda 3$, for example, is incident on the reflection region 17-3. In this manner, only the light of wavelength $\lambda 3$ is reflected as in the above mentioned case, and is applied to the collimate lens 18 and the optical fiber 19 via the diffraction grating 13. Accordingly, only the light of wavelength $\lambda 3$ can be selected.

Figure 5:
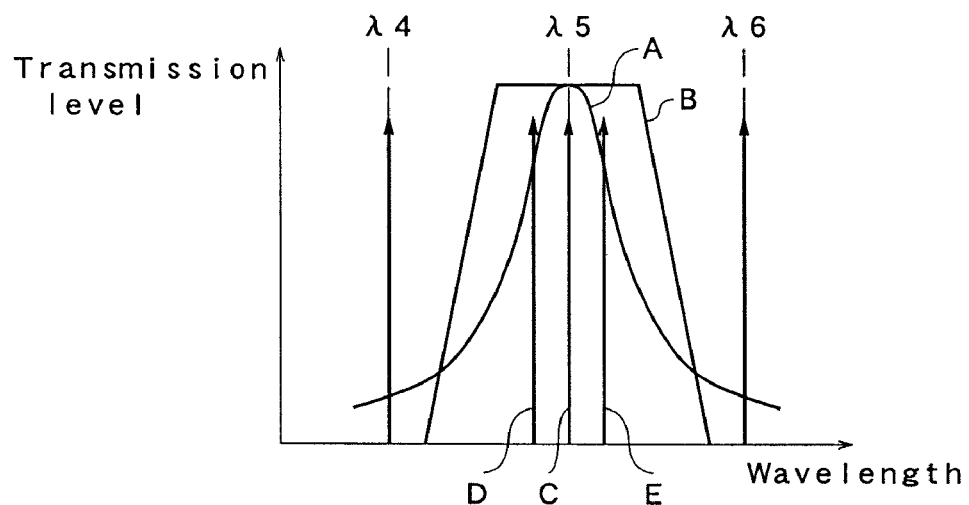
FIG. 5 is a view showing a relationship between wavelength selection characteristics and displacement of a wavelength of a light source according to the embodiment.
Figure 6A:
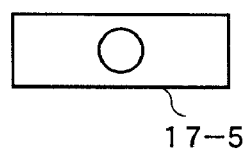
FIG. 6A is a view showing a relationship between an optical beam and the reflection region in the tunable filter according to the embodiment.
Figure 6B:
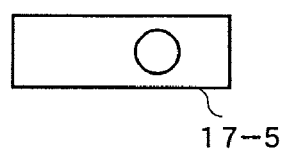
FIG. 6B is a view showing the relationship between the optical beam and the reflection region in the tunable filter according to the embodiment.
Figure 6C:
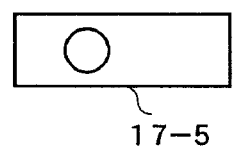
FIG. 6C is a view showing the relationship between the optical beam and the reflection region in the tunable filter according to the embodiment.

Next, wavelength selection characteristics of this tunable filter will be explained. In a case where the dielectric multilayer filter is employed, the filter has characteristics which generate a skirt part on a left and right sides of a selected wavelength as shown by a curved line A in FIG. 5 even when a high precision multilayer filter using two cavities is employed. On the other hand, since a wavelength is selected by utilizing a reflection in the reflection region of the mirror substrate 15, the tunable filter of the embodiment of the present invention has the sharp wavelength selection characteristics as shown by a curved line B in FIG. 5. Hence, when a wavelength of a light source slightly shifts as shown by a line D or E in FIG. 5, an output level changes in the dielectric multilayer filter having Gaussian distribution characteristics. In the present embodiment, however, the output level does not change since the wavelength selection characteristics have a rectangular shape. Further in a case where existence of a movement error of the driver 16 causes a minor misalignment of a moving direction on the Y axis as shown in FIG. 6A, FIG. 6B, and FIG. 6C, the output characteristics do not change as long as a laser beam is incident on any one of the reflection region, for example, the reflection region 17-5. As described above, in the present embodiment, tolerance to the misalignment is wide and a desired wavelength can be accurately selected. Since movement accuracy to the Y axis direction in the movement by the deriver 16 is, for example, about 10 μm, any one of the wavelength multiplexing lights branched for each wavelength by using the driver 16 with this accuracy can be accurately selected. In addition, even when the movement accuracy of the driver 16 deteriorates, the filter characteristics are prevented from being affected by enlarging the width "b" of the reflection region.

Second Embodiment

Figure 7:
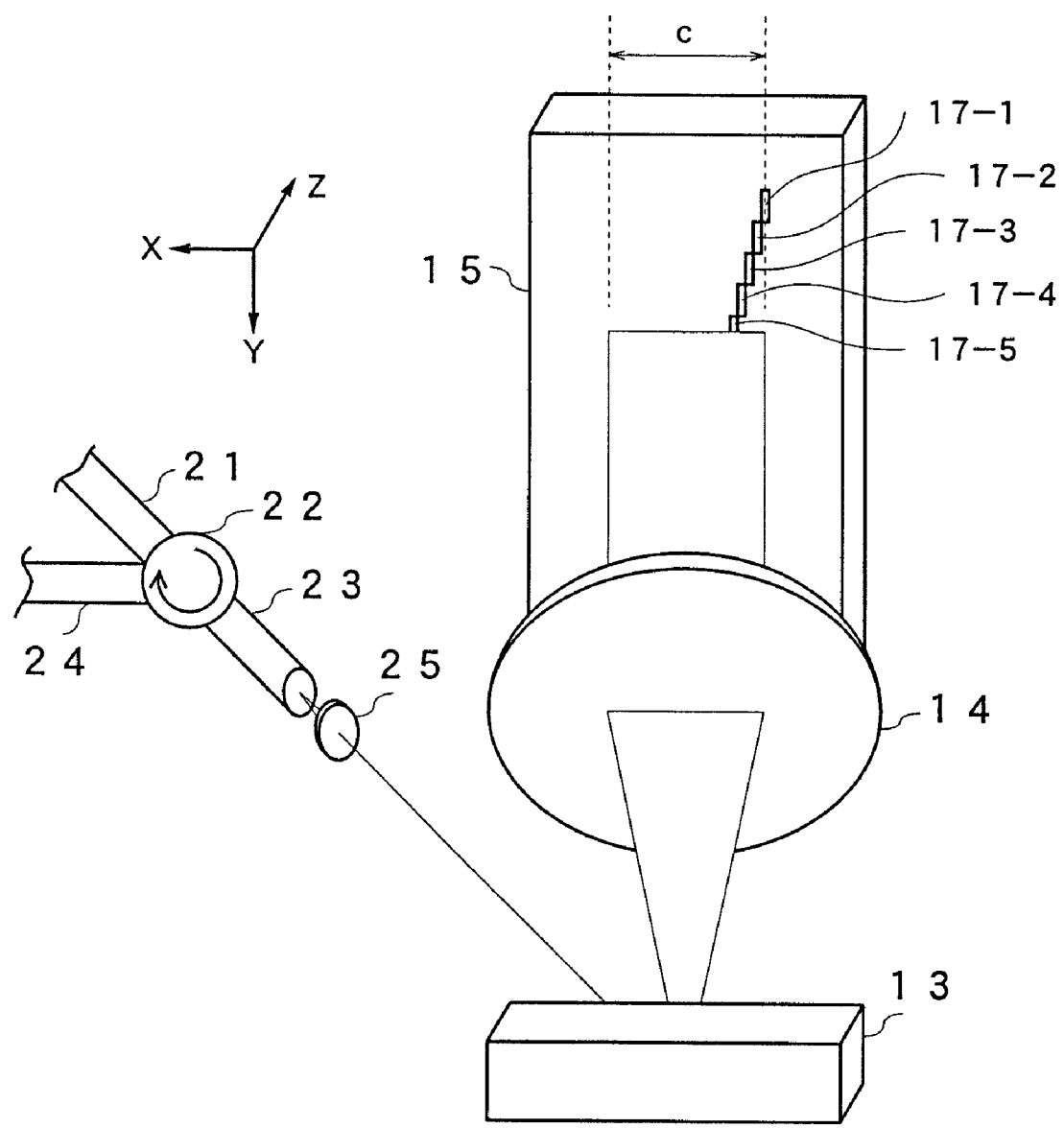
FIG. 7 is a perspective view showing a tunable filter according to a second embodiment of the present invention.

Referring to FIG. 7, a second embodiment of the present invention will be explained. In FIG. 7, an optical fiber 21 is an incident optical fiber in which an incident light is transmitted, and is connected to a circulator 22. Optical fibers 23 and 24 are further connected to the circulator 22. The circulator 22 outputs a light inputted from the optical fiber 21 to the optical fiber 23, and outputs a light inputted from the optical fiber 23 to the optical fiber 24. In addition, a collimate lens 25 is provided to another end of the optical fiber 23, and an incident light is incident on the refractive diffraction grating 13 same as that of the first embodiment. In the second embodiment, a position of the refractive diffraction grating 13 is different from a position of the lens 14, and they are arranged so that a belt-shaped light reflected by the refractive diffraction grating 13 can be incident on a line including a central axis of the lens 14. Other configurations are the same as those of the above described first embodiment, and the mirror substrate 15 and the driver 16 thereof are provided. Here, the optical fibers 21, 23, and 24, the circulator 22, and the collimate lens 25 constitute an incident and emitting part for making a light incident on an optical branching element and for outputting a selected light.

In this case, a light from the optical fiber 21 is applied to the optical fiber 23 via the circulator 22, and is further applied to the refractive diffraction grating 13 from the collimate lens 25. The light of dispersed wavelengths is incident on the line including the central axis of the lens 14 to be belt-shaped lights composed of different wavelengths respectively in different positions as shown in the figure. In this case, since the light incident on the lens 14 is incident on the line including its central axis, the light is emitted in parallel with an optical axis of the lens 14 and is applied to the mirror substrate 15. A light of any wavelength selected by the mirror substrate 15 is directly reflected to an incident direction, and is applied to the optical fiber 23 from the collimate lens 25 with passing through an identical optical axis via the refractive diffraction grating 13. And, the light is finally emitted to the optical fiber 24 by the optical circulator 22. The lights of other wavelengths pass through the mirror substrate 15. Thus, the tunable filter of the second embodiment can also select a light of arbitrary wavelength by moving the mirror substrate 15 to the Y axis direction.

Third Embodiment

Figure 8:
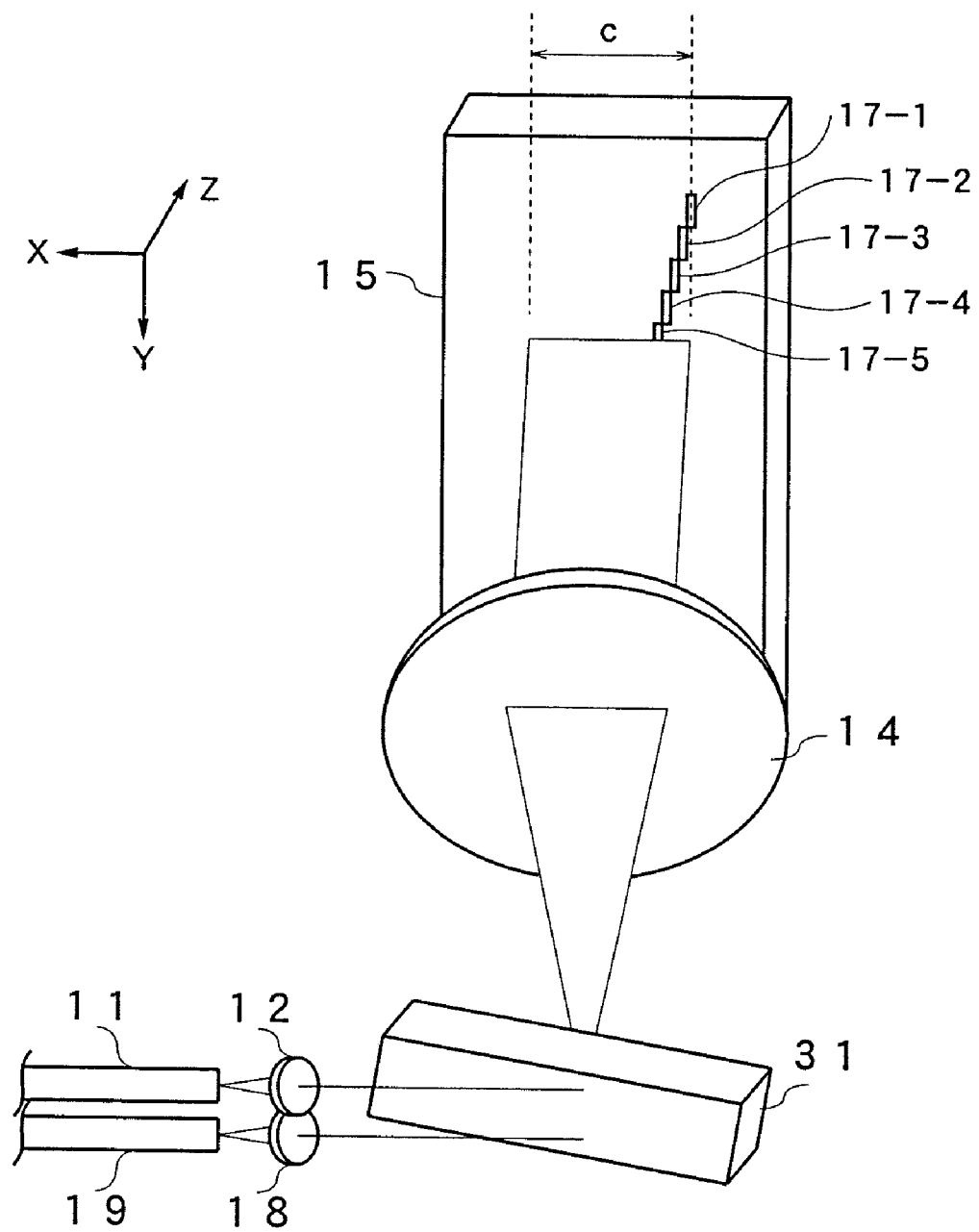
FIG. 8 is a perspective view showing a tunable filter according to a third embodiment of the present invention.

Referring to FIG. 8, a third embodiment of the present invention will be explained. In this embodiment, a transmission diffraction grating 31 is used as an optical branching element, and other configurations are the same as those of the above described first embodiment. In this case, a light from the inputting optical fiber 11 is guided to the transmission diffraction grating 31 via the collimate lens 12 to disperse the light at different angles for each wavelength. In addition, a selected light is received via the transmission diffraction grating 31, and the light is emitted from the collimate lens 18 and the optical fiber 19. Other configurations are the same as those of the above described first embodiment. Thus, the tunable filter of the second embodiment can also select a light of arbitrary wavelength by moving the mirror substrate 15.

Fourth Embodiment

Figure 9:
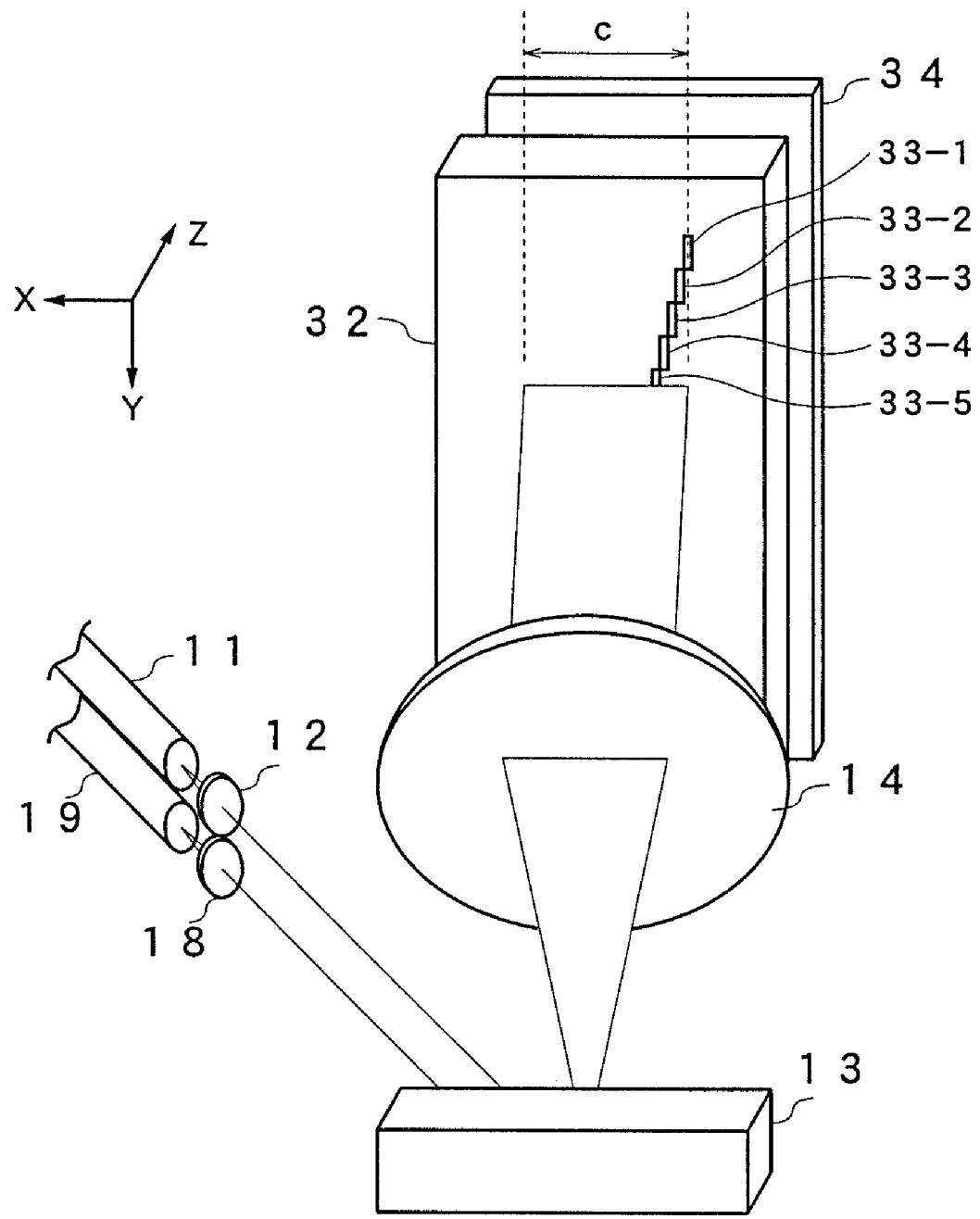
FIG. 9 is a perspective view showing a tunable filter according to a fourth embodiment of the present invention.

Referring to FIG. 9, a fourth embodiment of the present invention will be explained. In this embodiment, a slit substrate 32 is used instead of the above mentioned mirror substrate 15. The slit substrate 32 has a plurality of slits 33-1 to 33-x penetrating the substrate at the positions of the above mentioned respective reflection regions shown in FIG. 3A. A mirror 34 having a reflection surface on the XY plane is provided in parallel with the slit substrate 32. On this occasion, an interval between the lens 14 and the mirror 34 is equal to a focal length of the lens 14. In this manner, only a light passing through one of the slits is selected and reflected by the mirror 34, and is applied to the refractive diffraction grating 13 via the lens 14. The lights incident on the slits other than the slit of the slit substrate 32 are reflected or absorbed. In this case, it is preferable to arrange the mirror 34 close to the back surface of the slit substrate 32 because an error tolerance in the Y axis direction will be small when the interval between the lens 14 and the mirror 34 becomes wide. In addition, the mirror 34 may be formed on the back surface of the slit substrate 32. The slit substrate 32 and the mirror 34 may be employed in the above mentioned second and third embodiments.

Fifth Embodiment

Figure 10A:
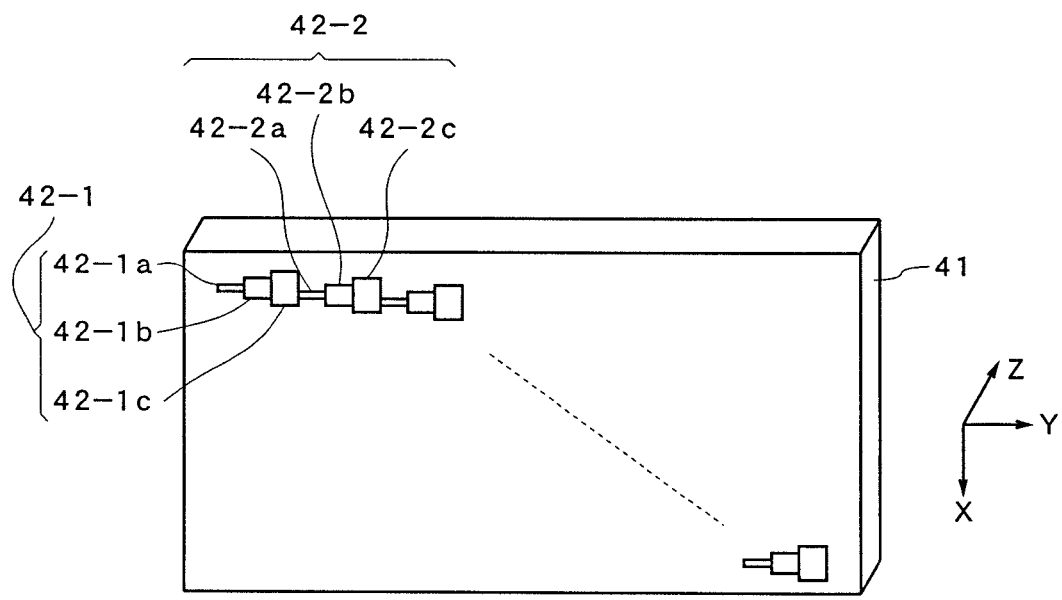
FIG. 10A is a perspective view showing a configuration of a mirror substrate according to a fifth embodiment.

Another example of a selective reflection part for selectively reflecting a light will be explained. The mirror substrate 13 used in the first to third embodiments forms rectangular reflection sub-regions in a reflection region in series along a diagonal line with shifting the regions to the X axis direction and to the Y axis direction as a longitudinal direction. Different wavelength selection characteristics can be obtained by changing a shape of this reflection region. FIG. 10A is a perspective view showing a mirror substrate 41 of the present embodiment. As shown in the figure, a reflection region 42-1 comprises reflection sub-regions 42-1a, 42-1b, and 42-1c and a reflection region 42-2 comprises reflection sub-regions 42-2a, 42-2b, and 42-2c. Subsequent reflection regions comprise three reflection sub-regions in this manner. The reflection sub-regions 42-1a, 42-1b, and 42-1c are formed so that their widths along the X axis direction can be expanded in a stepwise fashion with keeping a common center position on the X axis direction. A reflection sub-region 42-2a with an upper side identical with the lower side of the reflection sub-region 42-1*a* on the X axis direction is further formed, and further adjoining it, reflection sub-regions 42-2*b* and 42-2*c* with a common center position are arranged as shown in the figure. In the same manner, reflection regions expanding in a stepwise fashion are arranged along a diagonal line. Other configurations are the same as those of the above described first embodiment.

Figure 11A:
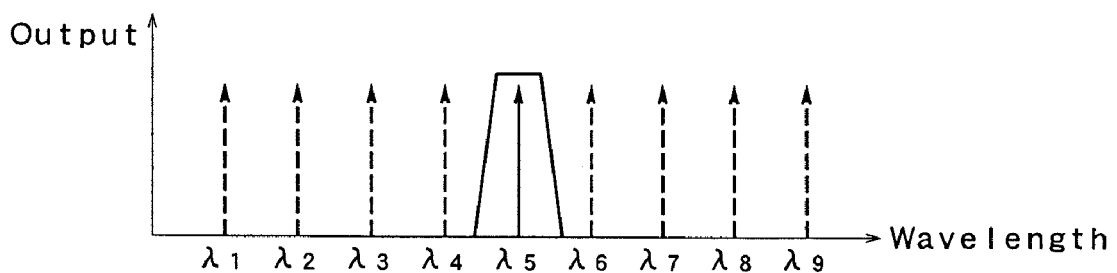
FIG. 11A is a graph showing wavelength-tunable characteristics of a tunable filter according to the embodiment.
Figure 11B:
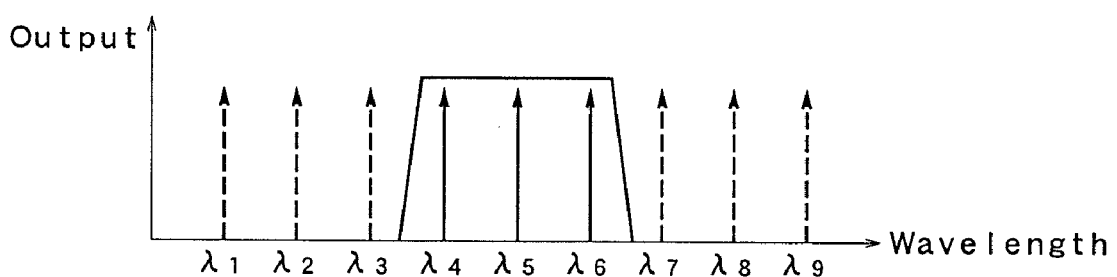
FIG. 11B is a graph showing the wavelength-tunable characteristics of the tunable filter according to the embodiment.
Figure 11C:
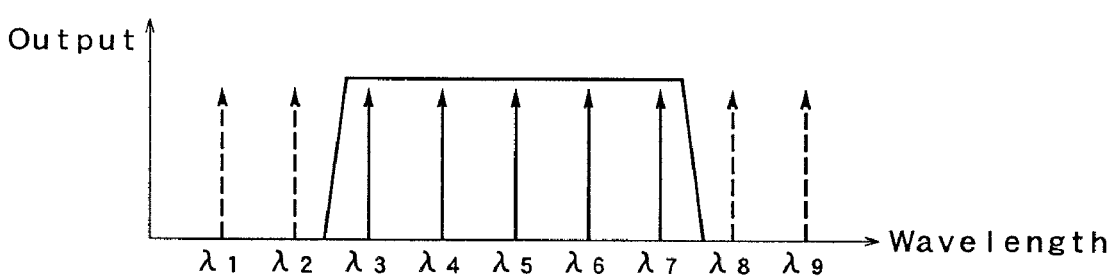
FIG. 11C is a graph showing the wavelength-tunable characteristics of the tunable filter according to the embodiment.

Next, referring to FIGS. 11A to 11C, wavelength selection characteristics of the fifth embodiment will be explained. As shown in FIG. 2, an incident light is reflected by the refractive diffraction grating 13 and is converted into belt-shaped lights by the lens 14. And, a light of wavelength λ5 in the belt-shaped lights is incident on a reflection sub-region 42-5*a* shown in FIG. 10A. On this occasion, only the light of wavelength λ5 is selectively reflected, and only the light of wavelength λ5 is selected as shown in FIG. 11A. When a light is incident on a reflection sub-region 42-5D by slightly moving the mirror substrate 41 in the Y axis direction, lights of wavelengths of previous and next grids, that is, lights of wavelengths λ4, λ5, and λ6 are selected as shown in FIG. 11B. In addition, when a wavelength reflection region is moved so that a light is incident on a reflection sub-region 42-5*c*, lights of wavelengths λ3 to λ7 are selected as shown in FIG. 11C. In addition, when the mirror substrate is moved in the Y axis direction to select another reflection region, a light of wavelength corresponding to the reflection region can be selected.

A tunable filter of the embodiment can change the wavelength selection characteristics by driving the mirror substrate 41 so that a light can be incident on a different reflection sub-region in a case of the system using, for example, not only the WDM light of a wavelength multiplexing at intervals of 0.4 nm but also the light at intervals of 0.8 nm, 0.2 nm, and so on, and can be used for various WDM system.

Figure 10B:
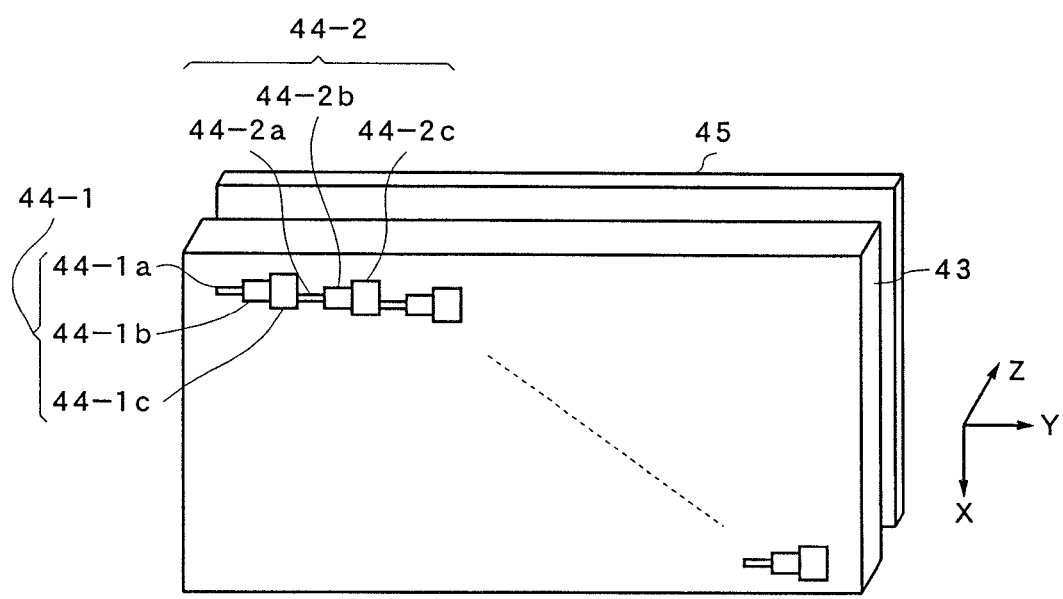
FIG. 10B is a perspective view showing a configuration of a slit substrate according to a modified example of the fifth embodiment.

FIG. 10B shows a modified example of the fifth embodiment, and a slit substrate 43 and a mirror 45 placed behind it constitute a reflection part as with the fourth embodiment. In this embodiment, a slit 44-1 comprises sub-slits 44-1*a*, 44-1*b*, and 44-1*c* and a slit 44-2 comprises sub-slits 44-2*a*, 44-2*b*, and 44-2*c*. Subsequent slits comprise three sub-slits in this manner. The adjoining sub-slits 44-1*a*, 44-1*b*, and 44-1*c* are provided with keeping a common position on the X axis direction as with FIG. 10A. And, the next three sub-slits 44-2*a*, 44-2*b*, and 44-2*c* are formed with shifting their position for a width in the X axis direction of the sub-slit 44-1*a*. In the same manner, pairs of these three sub-slits are subsequently formed on a diagonal line. And, the mirror 45 is provided behind the slit substrate 43. Other configurations are the same as those of the fourth embodiment.

In addition, in a case of using the selective reflection part shown in FIG. 10B, the wavelength selection characteristics same as those in FIG. 11A to FIG. 11C can also be obtained by moving the slit substrate 43. A range of wavelength selection can be digitally changed by varying the wavelength reflection sub-region in a stepwise way as described above.

Sixth Embodiment

Figure 12A:
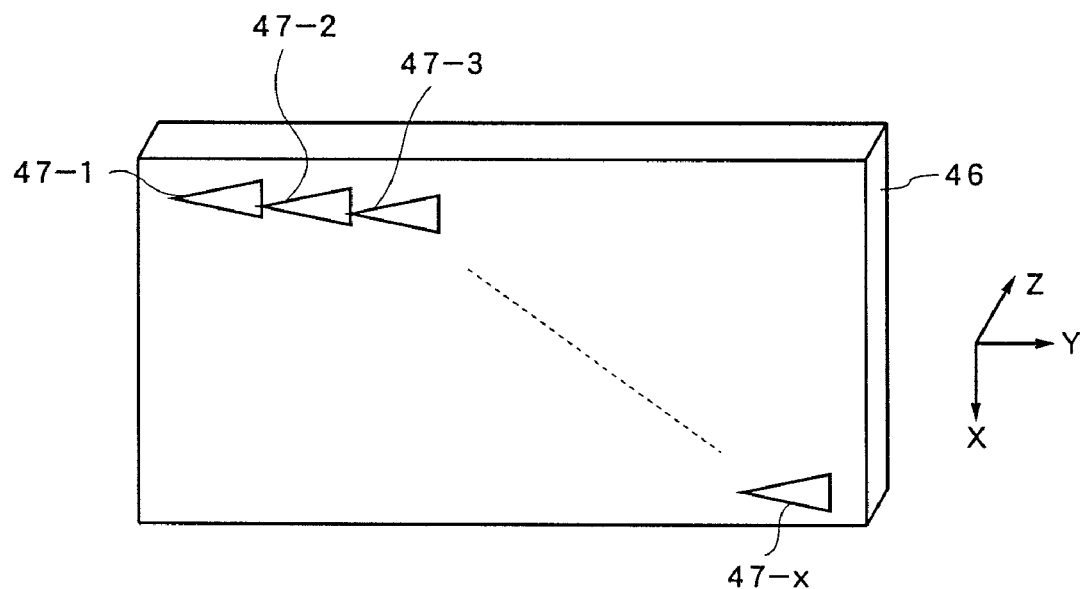
FIG. 12A is a perspective view showing a configuration of a mirror substrate according to a sixth embodiment.

A sixth embodiment of the present invention will be explained. In this embodiment, reflection regions 47-1, 47-2, to 47-*x* of a mirror substrate 46 are in a triangular shape so that a width in the X axis direction can gradually change as shown in FIG. 12A. The respective reflection regions are arranged with respectively shifting their positions on the X axis for a width "a" in the X axis direction as with the reflection region in the above mentioned first embodiment. And, these reflection regions 47-1 to 47-*x* are arranged on a diagonal line of the mirror substrate 46. Other configurations are the same as those of the first embodiment.

Figure 13A:
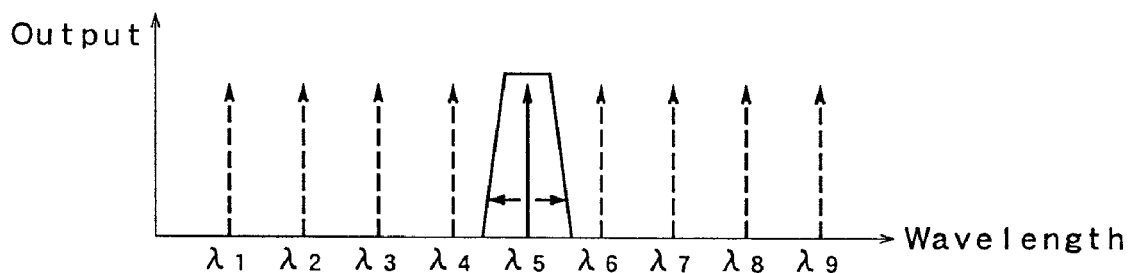
FIG. 13A is a graph showing wavelength-tunable characteristics of a tunable filter according to the embodiment.
Figure 13B:
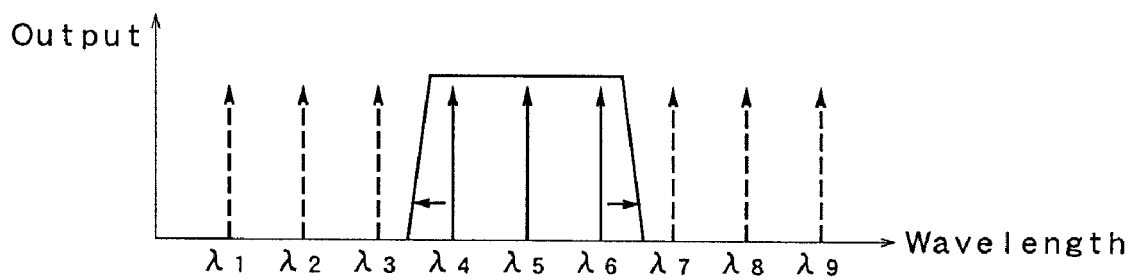
FIG. 13B is a graph showing the wavelength-tunable characteristics of the tunable filter according to the embodiment.
Figure 13C:
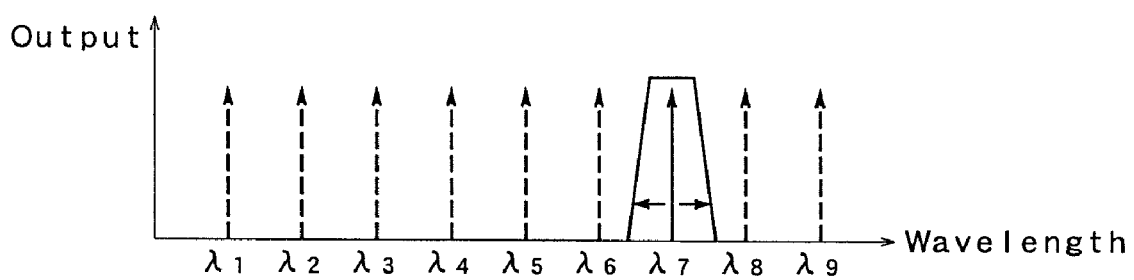
FIG. 13C is a graph showing the wavelength-tunable characteristics of the tunable filter according to the embodiment.

Referring to FIG. 13A to FIG. 13C, selection characteristics of the sixth embodiment will be explained. As shown in FIG. 2, an incident light is reflected by the refractive diffraction grating 13 to be converted into belt-shaped lights. When a light of wavelength λ5 among the belt-shaped lights is incident on the reflection region 47-5, the light of wavelength λ5 is selectively reflected and the light of wavelength λ5 is selected. On this occasion, when the driver 16 slightly moves an incident position, a selection range of light can be expanded or narrowed as shown in FIG. 13B because the reflection regions in a triangular shape are formed. In this manner, the selection range can be arbitrarily selected based on the incident position. When the incident position is widely shifted, a light of another wavelength can be selected, for example, as shown in FIG. 13C, and when the position is slightly shifted, the selection range can be changed. A condition of the changing can be arbitrarily changed based on movement distance of the mirror substrate 46 and on a shape of the reflection region.

Figure 12B:
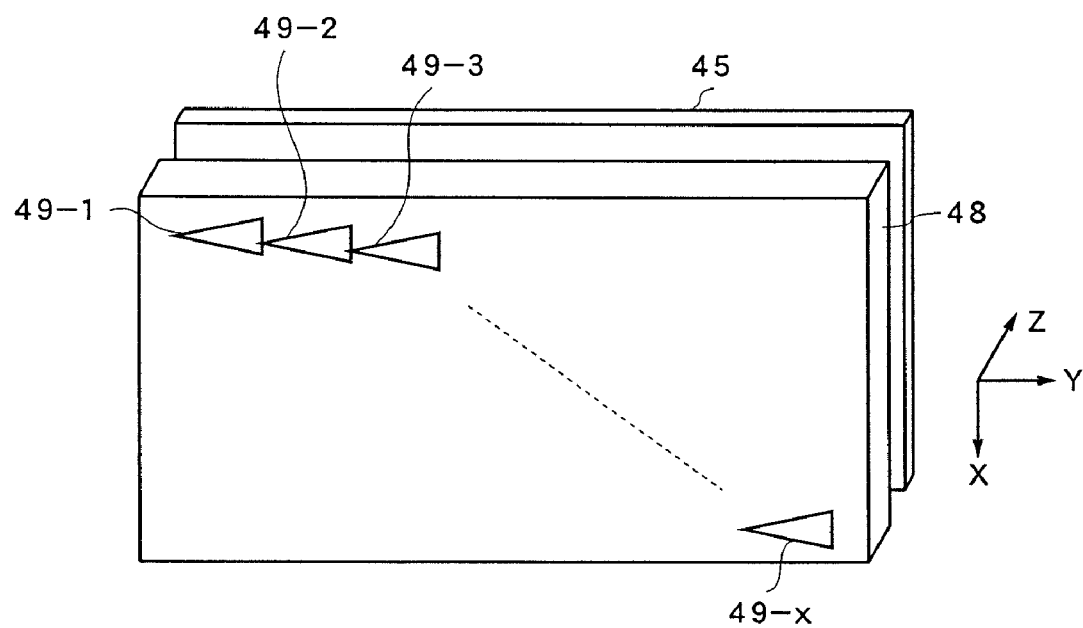
FIG. 12B is a perspective view showing a configuration of a slit substrate according to a modified example of the sixth embodiment.

FIG. 12B shows a modified example of the sixth embodiment, and a slit substrate 48 and the mirror 45 placed behind it constitute a reflection part as with the fourth embodiment. In this embodiment, slits 49-1, 49-2 to 49-*x* of the slit substrate 48 are formed in a triangular shape, and the mirror 45 is arranged behind the substrate as with FIG. 12A. Other configurations are the same as those of the fourth embodiment.

In addition, in a case where the slits and the mirror behind them as shown in FIG. 12B are provided, the wavelength selection range can also be continuously changed based on the incident position of light as shown in FIG. 13A to FIG. 13C.

Seventh Embodiment

Figure 14A:
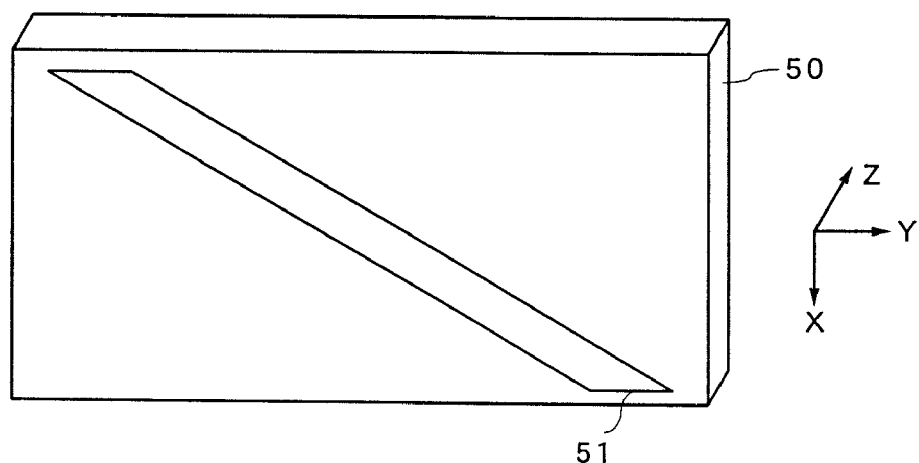
FIG. 14A is a perspective view showing a configuration of a mirror substrate according to a seventh embodiment.
Figure 15A:
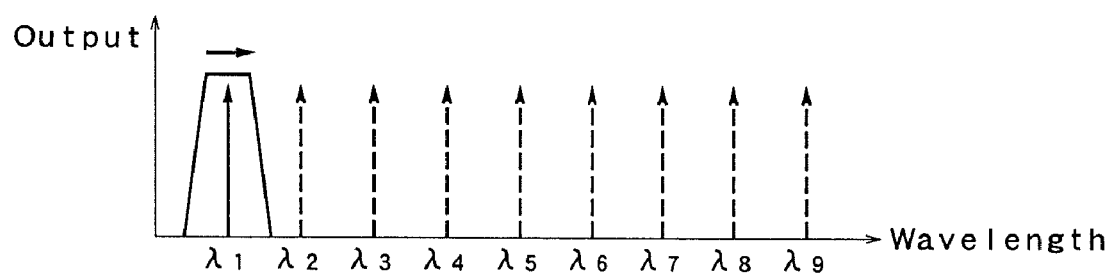
FIG. 15A is a graph showing wavelength-tunable characteristics of a tunable filter according to the embodiment.
Figure 15B:
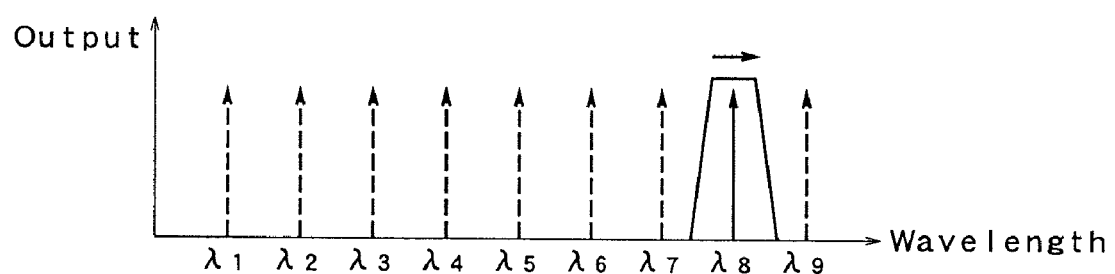
FIG. 15B is a graph showing the wavelength-tunable characteristics of the tunable filter according to the embodiment.

A seventh embodiment of the present invention will be explained. In this embodiment, a reflection region 51 in a parallelogram shape of the mirror substrate 50 is formed on a diagonal line of the XY plane with keeping a constant width in the Y axis direction, as shown in FIG. 14A. Other configurations are the same as those of the first embodiment. In this manner, wavelength selection characteristics with a constant width can be continuously changed on a wavelength axis as shown in FIG. 15A and FIG. 15B.

Figure 14B:
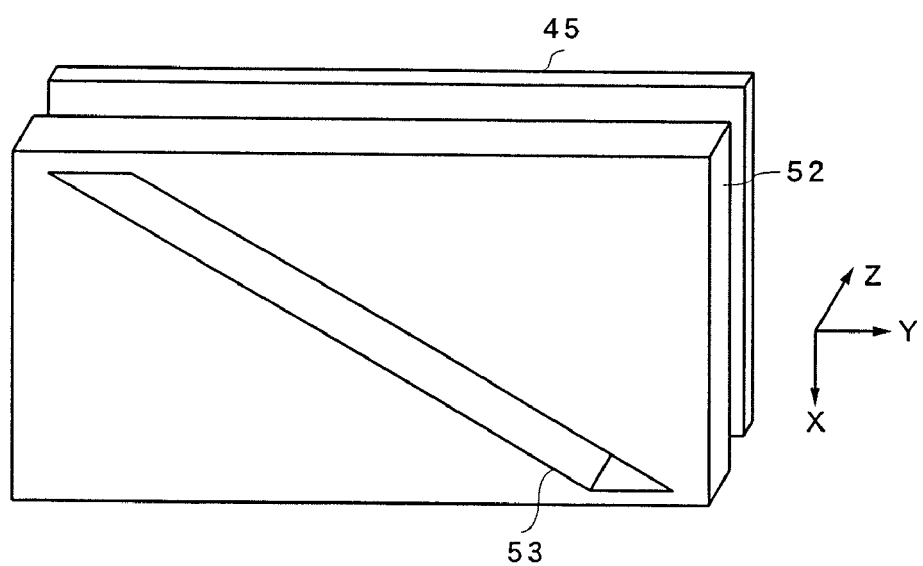
FIG. 14B is a perspective view showing a configuration of a slit substrate according to a modified example of the seventh embodiment.

Next, FIG. 14B shows a modified example of the seventh embodiment, and a slit substrate 52 and the mirror substrate 45 behind it constitute a reflection part as with the fourth embodiment. In this embodiment, the slit 53 in a parallelogram shape provided on the slit substrate 52 is formed on a diagonal line of the XY plane. Other configurations are the same as those of the fourth embodiment. In this case, wavelength selection characteristics with a constant width can also be continuously changed on a wavelength axis as shown in FIG. 15A and FIG. 15B.

Eighth Embodiment

Figure 16A:
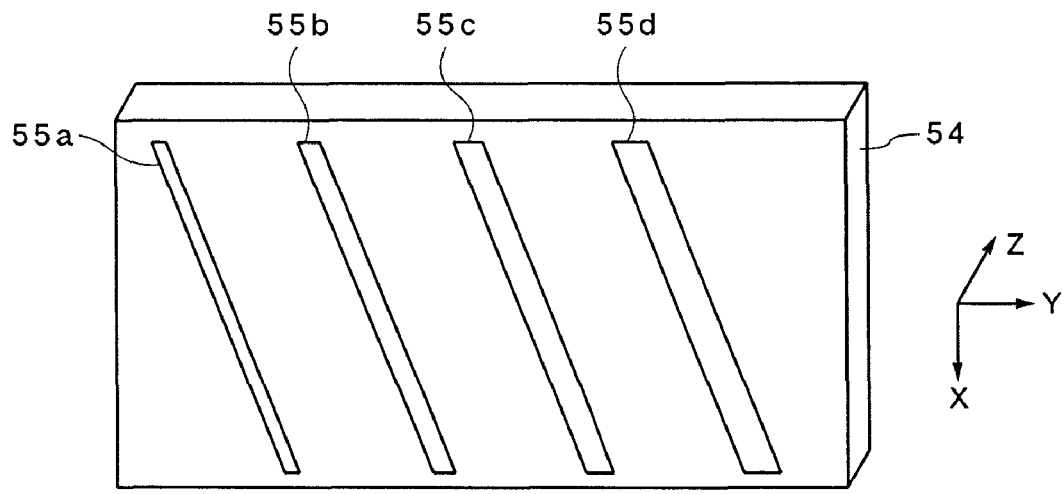
FIG. 16A is a perspective view showing a configuration of a mirror substrate according to an eighth embodiment.

An eighth embodiment of the present invention will be explained. In this embodiment, as shown in FIG. 16A, four reflection regions 55*a* to 55*d* in a parallelogram shape are formed on the mirror substrate 54 so as to slant on the XY plane and not to overlap in the Y axis direction each other with keeping widths in the Y axis direction. Other configurations are the same as those of the first embodiment. The widths in the Y axis direction of these reflection regions are different each other.

Referring to FIG. 17A to FIG. 17D, wavelength selection characteristics of the eighth embodiment will be explained. As shown in FIG. 2, an incident light is reflected by the refractive diffraction grating 13 to be converted into a parallel light by the lens 14. When a light of wavelength $\lambda 1$ in this parallel light is incident on the reflection region 55a, the light of wavelength $\lambda 1$ is selected as shown in FIG. 17A. And, the wavelength selection characteristics continuously shift on a wavelength axis with keeping its shape as shown in FIG. 17B by moving the mirror substrate 54 in the Y axis direction. In addition, when a light is incident on the reflection region 55b by further moving the mirror substrate 54, a characteristic having selection characteristics in broader band is selected, for example, as shown in FIG. 17C and the characteristic is, for example, for a region including lights of wavelengths $\lambda 1$ and $\lambda 2$. And, the characteristic can be shifted on a wavelength axis as shown in FIG. 17D by moving the mirror substrate 54 in the Y axis direction. In a case where further broader reflection region 55c or 55d is selected, the broad wavelength selection characteristics can be changed on the wavelength axis. As described above, the wavelength selection characteristics with a certain width such as shown in FIG. 17A or FIG. 17C is selected and a wavelength can be continuously shifted by moving the mirror substrate 54 in the Y axis direction.

Figure 16B:
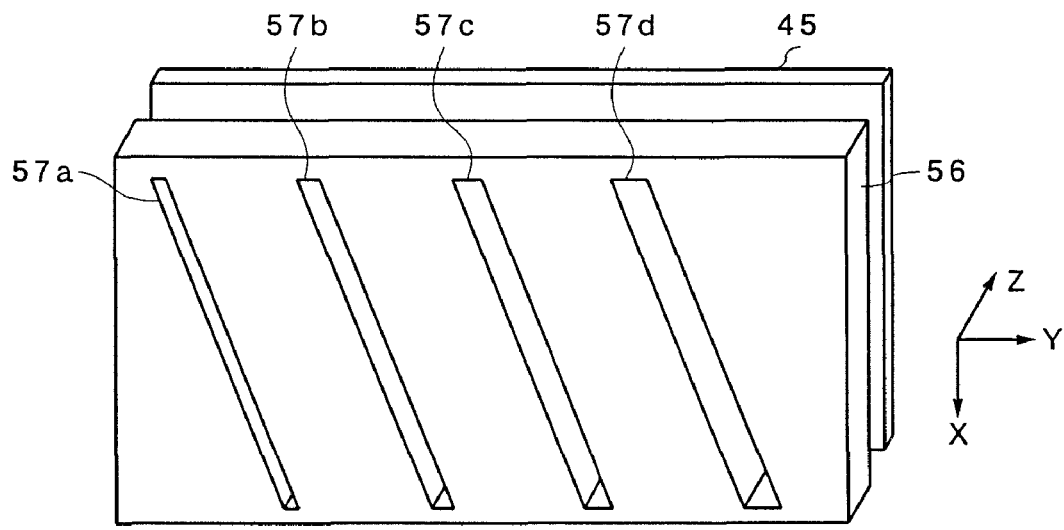
FIG. 16B is a perspective view showing a configuration of a slit substrate according to a modified example of the eighth embodiment.

Next, FIG. 16B shows a modified example of the eighth embodiment, and a slit substrate 56 and the mirror substrate 45 behind it constitute a reflection part as with the fourth embodiment. In this embodiment, slits 57a to 57d in a parallelogram shape are provided to the slit substrate 56 so as not to overlap in the Y axis direction each other as with FIG. 16A. Other configurations are the same as those of the fourth embodiment.

In this case, the same wavelength selection characteristics such as shown in FIG. 17A to FIG. 17D can be obtained by moving the slit substrate in the Y axis direction.

The above explained respective embodiments described a tunable filter used in an optical communication network where the wavelength division multiplexing communication is performed. However, the tunable filter can be applied not only to the WDM system but also to an optical measurement apparatus and a wavelength-tunable laser.

In the first to sixth embodiments, the reflection regions of light and the slits are arranged with being aligned on the XY plane. However, there is no need for necessarily arranging them to be aligned and it can be realized to arrange necessary reflection regions or slits at arbitrary positions. In addition, the reflection region may be formed so as to select lights of a plurality of discontinuous wavelengths at the same time.

Furthermore, the mirror substrate and the slit substrate may be configured so as to be replaced. Accordingly, a tunable filter having various wavelength selection characteristics can be realized by replacing them.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese application No. 2007-006868 filed on Jan. 16, 2007 is hereby incorporated by reference.

What is claimed is:

1. A tunable filter comprising:
an optical branching element for spatially dispersing an incident light for each of wavelengths in the incident light to output the dispersed lights and for making a selected reflected light be incident toward an incident direction of said incident light;
a light focusing element for focusing the lights of respective wavelengths dispersed for each of wavelengths in said optical branching element on an identical plane with keeping a relative relationship of incident position;
a mirror substrate which is provided in a movable state at a position on which belt-shaped lights from said light focusing element are focused, and includes a plurality of reflection regions different for each of the lights of wavelengths to be selected, wherein said reflection regions are arranged at an arbitrary position toward a direction different from a distribution direction of said belt-shaped lights; and
a driver for moving said mirror substrate toward a direction different from the distribution direction of said belt-shaped lights.

2. The tunable filter according to claim 1, wherein a plurality of said reflection regions of said mirror substrate are in a rectangular shape whose short side is a constant width in the distribution direction of the belt-shaped light emitted from said light condenser and whose long side is perpendicular to the short side.

3. The tunable filter according to claim 1, wherein each of said reflection regions of the mirror substrate comprises a plurality of reflection sub-regions where widths in the distribution direction of the belt-shaped lights emitted from said light focusing element are different from each other.

4. The tunable filter according to claim 1, wherein a width of each said reflection region of the mirror substrate in the distribution direction of the belt-shaped lights emitted from said light focusing element continuously varies.

* * * * *